United States Patent
Morin et al.

(10) Patent No.: US 11,293,240 B2
(45) Date of Patent: Apr. 5, 2022

(54) INTEGRATED MULTI-STAGE SAND SEPARATION SYSTEM

(71) Applicant: ENERCORP SAND SOLUTIONS INC., Calgary (CA)

(72) Inventors: Justin Morin, Calgary (CA); Rory Nagge, Calgary (CA); Ryan Thomas Bowley, Calgary (CA)

(73) Assignee: ENERCORP ENGINEERED SOLUTIONS INC., Calgary (CA)

( * ) Notice: Subject to any disclaimer, the term of this patent is extended or adjusted under 35 U.S.C. 154(b) by 14 days.

(21) Appl. No.: 16/558,970

(22) Filed: Sep. 3, 2019

(65) Prior Publication Data
US 2020/0072004 A1    Mar. 5, 2020

Related U.S. Application Data

(60) Provisional application No. 62/726,730, filed on Sep. 4, 2018.

(51) Int. Cl.
*E21B 21/06*       (2006.01)
*B01D 19/00*       (2006.01)
(Continued)

(52) U.S. Cl.
CPC ........ *E21B 21/065* (2013.01); *B01D 17/0217* (2013.01); *B01D 19/0057* (2013.01);
(Continued)

(58) Field of Classification Search
CPC ... E21B 21/065; E21B 21/067; B01D 21/267; B01D 21/10; B01D 21/003; B01D 21/0006; B01D 19/0057; B01D 17/0217
See application file for complete search history.

(56) References Cited

U.S. PATENT DOCUMENTS 3,212,232 A * 10/1965 McMinn ............ B01D 19/0057
                                                    95/243
3,672,127 A *  6/1972 Mayse ................ B01D 17/045
                                                    204/662
(Continued)

FOREIGN PATENT DOCUMENTS

CA          2041479 A1 * 10/1992

*Primary Examiner* — Liam Royce
(74) *Attorney, Agent, or Firm* — MH2 Technology Law Group LLP

(57) ABSTRACT

A separator system includes a separator including an inlet configured to receive a mixed fluid, a first outlet, and a second outlet. The separator system includes a pressure tank physically coupled to the separator, and including a partition wall defining a collection chamber and a separation chamber in the pressure tank, a first inlet communicating with the collection chamber and coupled to the separator to receive at least some of the solids component from the separator, and a second inlet communicating with the separation chamber and in communication with the separator. The second inlet is configured to receive at least some of the liquid component and the gaseous component from the separator. The pressure tank also includes a first drain in communication with the collection chamber, and a first liquid outlet in communication with the separation chamber. The pressure tank includes a gas outlet in communication with the separation chamber.

12 Claims, 4 Drawing Sheets

(51) Int. Cl.
  *B01D 17/02*   (2006.01)
  *B01D 21/00*   (2006.01)
  *B01D 21/02*   (2006.01)
  *B01D 21/26*   (2006.01)

(52) U.S. Cl.
  CPC ........... *B01D 21/003* (2013.01); *B01D 21/10* (2013.01); *B01D 21/267* (2013.01); *E21B 21/067* (2013.01); *B01D 21/0006* (2013.01)

(56) References Cited

U.S. PATENT DOCUMENTS

| | | | | |
|---|---|---|---|---|
| 3,802,501 | A | * | 4/1974 | Mecusker ................. B04C 9/00 166/75.12 |
| 5,236,605 | A | * | 8/1993 | Warncke ................. B01D 17/00 210/799 |
| 5,637,233 | A | * | 6/1997 | Earrusso ............. B01D 21/003 210/241 |
| 2006/0086658 | A1 | * | 4/2006 | Hesse ................ B01D 17/0217 210/512.2 |

* cited by examiner

INTEGRATED MULTI-STAGE SAND SEPARATION SYSTEM

CROSS-REFERENCE TO RELATED APPLICATIONS

This application claims priority to U.S. Provisional Patent Application having Ser. No. 62/726,730, filed on Sep. 4, 2018, the entirety of which is incorporated herein by reference.

BACKGROUND

Hydraulic fracturing is a well-treatment process in which preferential flowpaths for hydrocarbons are established in a subterranean rock formation by pumping a fluid at high pressures into a well to initiate fractures in the rock formation. The fluid is predominately water, but may also include solids, such as sand or ceramic proppants, which at least partially fill the fractures and maintain the preferential flowpaths.

When oil or other fluids are produced/recovered from the well, it may be desirable to remove sand or other solids from the produced fluid. A separator system is employed to perform this function. One type of separator system used for this application is a cyclone separator. The cyclone separator operates at steady state by imparting a generally helical flowpath in a fluid. In such a flow, the denser particulate matter drops out into a hopper, because of its greater density, while the less-dense liquids and gases flow inward and up through an outlet.

Other separator systems include sedimentation tanks. In sedimentation tanks, the produced fluid may be fed to the tank, where the solids may settle out, and immiscible liquids/gases may likewise stratify based on density. Weirs may be employed in such tanks to separate the various phases from one another.

Cyclone separators and sedimentation tanks are sometimes used in series. For example, the cyclone separator may be positioned upstream of the sedimentation tank. As such, the cyclone separators remove the solids, while the sedimentation tanks allow the different phases of fluid (e.g., gas, water, and oil) to separate. However, this can result in a relatively large footprint for the separator system and, in some cases, the space at the wellsite may be limited.

SUMMARY

A separator system is disclosed. The separator system includes a separator including an inlet configured to receive a mixed fluid, a first outlet, and a second outlet, the separator being configured to at least partially separate a solids component of the mixed fluid from a liquid component and a gaseous component of the mixed fluid, and to direct the separated solids component to the first outlet and at least some of the liquid and gaseous components to the second outlet. The separator system also includes a pressure tank physically coupled to the separator, the pressure tank including a partition wall defining a collection chamber and a separation chamber in the pressure tank, a first inlet communicating with the collection chamber and coupled to the first outlet of the separator, the first inlet being configured to receive at least some of the solids component from the first outlet and provide the solids component to the collection chamber, and a second inlet communicating with the separation chamber and in communication with the second outlet of the separator. The second inlet is configured to receive at least some of the liquid component and the gaseous component from the second outlet. The pressure tank also includes a first drain in communication with the collection chamber, and a first liquid outlet in communication with the separation chamber. The first liquid outlet is configured to allow at least a portion of the liquid component that is received into the separation chamber to be removed therefrom. The pressure tank also includes a gas outlet in communication with the separation chamber. The gas outlet is configured to allow at least a portion of a gaseous component that is received into the separation chamber to be removed therefrom.

A method for separating is disclosed. The method includes receiving a mixed flow into a separator. The mixed flow includes a fluid component and a solid component. The method also includes separating the fluid component from the solid component in the separator, receiving at least some of the solid component from the separator into a collection chamber of a pressure tank, and receiving at least some of the fluid component from the separator into a separation chamber of the pressure tank. The collection chamber and the separation chamber are separated by a partition wall in the pressure tank. The method further includes separating the fluid component into a gas and one or more liquids in the separation chamber.

A pressure tank is also disclosed. The pressure tank includes a partition wall between a collection chamber and a separation chamber defined in the pressure tank, and a first inlet communicating with the collection chamber and configured to be physically coupled to a first outlet of a separator. The first inlet is configured to receive a solids component from the first outlet and provide the solids component to the collection chamber. The pressure tank further includes a second inlet communicating with the separation chamber and in communication with a second outlet of the separator. The second inlet is configured to receive a liquid component and a gaseous component from the second outlet of the separator. The pressure tank further includes a first drain in communication with the collection chamber, and a first liquid outlet in communication with the separation chamber. The first liquid outlet is configured to allow at least a portion of the liquid component that is received into the separation chamber to be removed therefrom. The pressure tank includes a gas outlet in communication with the separation chamber. The gas outlet is configured to allow at least a portion of a gaseous component that is received into the separation chamber to be removed therefrom.

The foregoing summary is intended merely to introduce some aspects of the following disclosure and is thus not intended to be exhaustive, identify key features, or in any way limit the disclosure or the appended claims.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
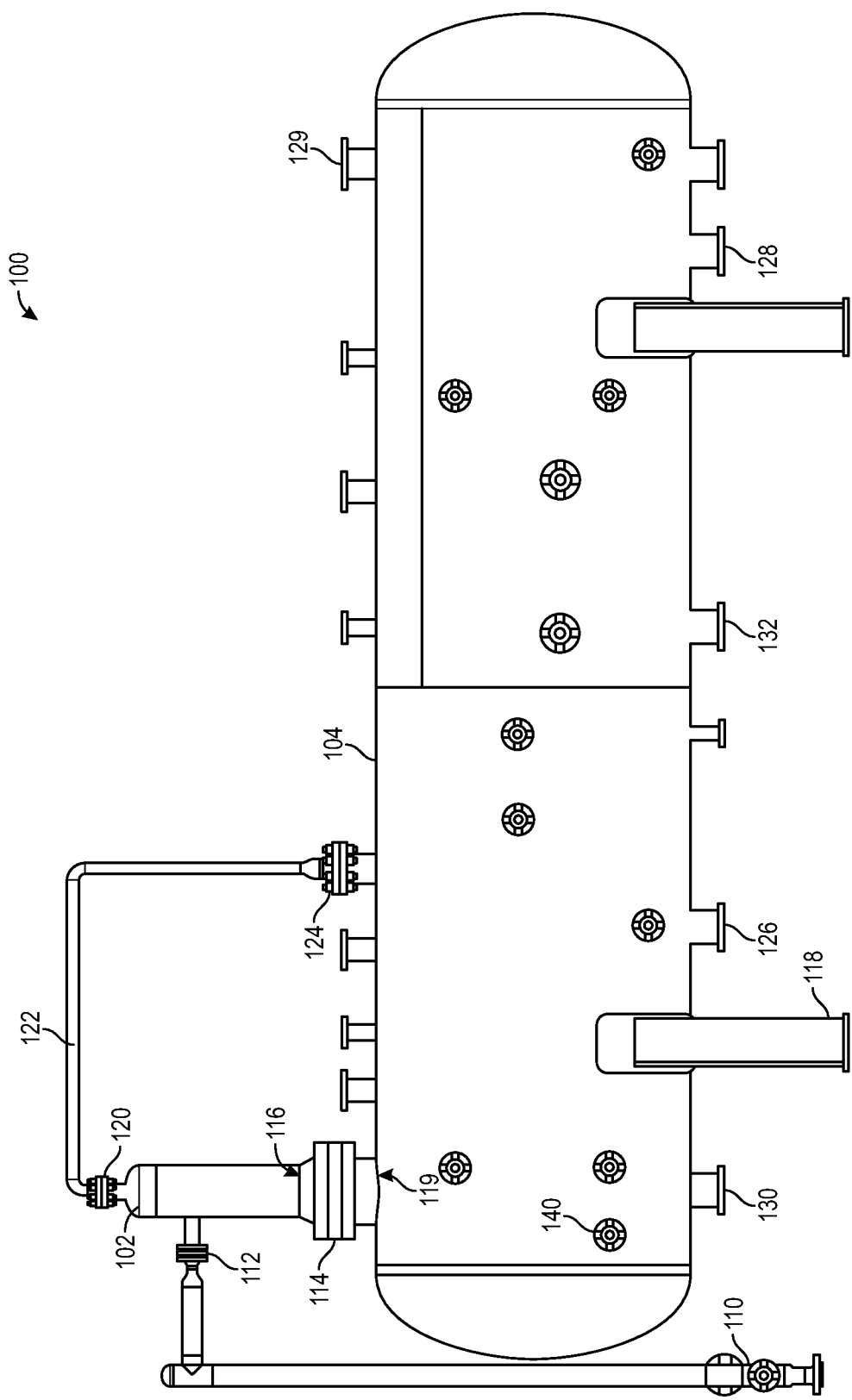
FIG. 1 illustrates a side view of an integrated, multi-stage separator system, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a side view of an integrated, multi-stage separation system 100, according to an embodiment. The system 100 includes a separator 102, which may be a cyclone separator, and may be configured to separate solids from liquids and gases, but may also be configured to separate any matter based on density (e.g., two fluids of different densities). The system 100 further includes a pressure tank 104. The pressure tank 104 may be in a horizontal configuration, e.g., having a central longitudinal axis that extends parallel to the ground. The pressure tank 104 may be internally partitioned into a solids collection chamber and a separation chamber, as will be explained in greater detail below. The pressure tank 104 may be a single piece or may be two half-cylinders that are connected together, axial-end-to-end.

The system 100 may include a mixed-fluid inlet 110, which may be connected to an inlet 112 of the separator 102.

The separator 102 may be physically connected to the pressure tank 104 via a close-coupled (e.g., no external piping or tubing therebetween) flange connection 114, and a first outlet 116 of the separator 102 may extend through the flange connection 114. The separator 102 and the pressure tank 104 may thus both be supported by a base 118 (e.g., two or more legs) connected to the pressure tank 104. The pressure tank 104 may be generally cylindrical, with convex ends and a central axis that extends horizontally, but in other embodiments, may be any other suitable shape. As shown, the separator 102 may be vertically above the pressure tank 104, e.g., supported thereby via the flange connection 114. The pressure tank 104 may include a first inlet 119, which may communicate with the first outlet 116 of the separator 102.

The separator 102 may further include a second outlet 120. A crossover line 122 may extend from the second outlet 120 to a second inlet 124 of the pressure tank 104. The crossover line 122 may communicate the second outlet 120 to the interior of the pressure tank 104.

The pressure tank 104 may include a first liquid outlet 126, a second liquid outlet 128, and a gas outlet 129. The outlets 126, 128, 129 may be positioned to receive fluids from within the separator region of the pressure tank 104, as will be described in greater detail below. As shown, however, the gas outlet 129 is coupled to the top of the pressure tank 104, while the liquid outlets 126, 128 are positioned at the bottom thereof. The outlets 126, 128, 129 may be each be coupled to suitable pipes or hoses for removal of gases, liquids, and/or solids received therethrough.

The pressure tank 104 may include a first drain 130 and a second drain 132, also positioned at the bottom of the pressure tank 104. The drains 130, 132 may be configured to allow drainage of solids and/or liquids from within the pressure tank 104, e.g., as part of a blowdown procedure to empty the bottom of the pressure tank 104 of solids. For example, the first drain 130 may be configured to communicate with the collection chamber, and the second drain 132 may be configured to communicate with the separation chamber, as will be described in greater detail below. The pressure tank 104 may further include one or more washout connections 140. Hoses may be connected to the washout connection 140, e.g., to circulate water through the pressure tank 104, e.g., as part of the blowdown procedure or another washout procedure.

Figure 2:
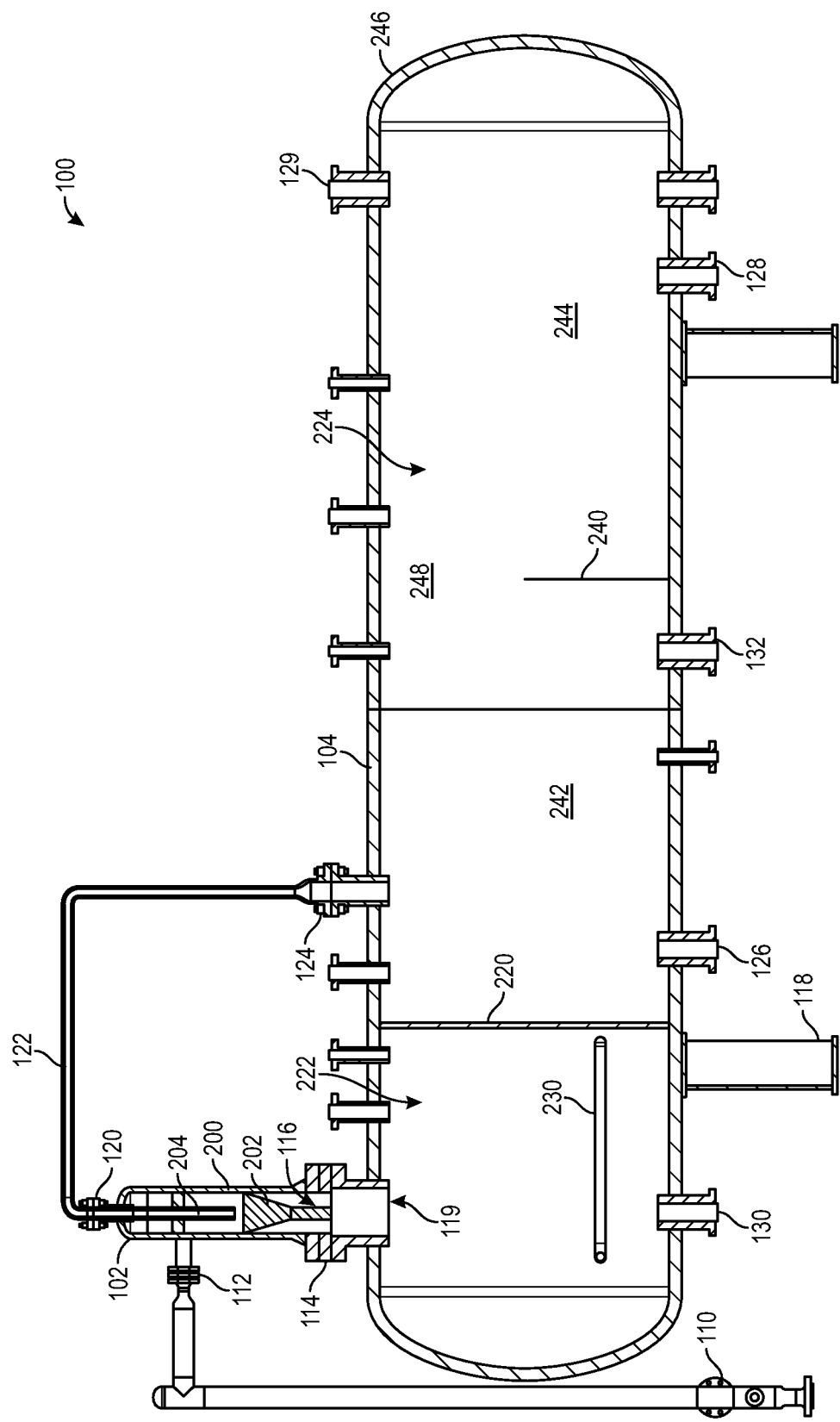
FIG. 2 illustrates a side, cross-sectional view of the separator system, according to an embodiment.

FIG. 2 illustrates a side, cross-sectional view of the separation system 100, according to an embodiment. As mentioned above, the system 100 generally includes the separator 102 and the tank 104, the internal components of which are now visible. Specifically, in an embodiment, the separator 102 may include a hollow, generally cylindrical housing 200, in which a conical structure 202 and an outlet tube 204 are positioned, with the conical structure 202 surrounding the outlet tube 204. The inlet 112 to the separator 102 may be tangentially oriented, so as to induce a vortex flow therein that pushes relatively dense solids to the outside. The relatively dense matter (e.g., solids) may contact the wall of the conical structure 202 and drop out of the flow, while relatively light matter (e.g., gases and liquids) are received through the outlet tube 204. From the outlet tube 204, such liquids and gases may proceed through the second outlet 120 through the crossover line 122, and into the pressure tank 104 via the second inlet 124.

As mentioned above, the pressure tank 104 may be partitioned. For example, the pressure tank 104 may include an interior partition wall 220, which may divide the pressure tank 104 into a collection chamber 222 and a separation chamber 224 on opposite axial (e.g., horizontal) sides of the wall 220, such that the chambers 222, 224 are horizontally-adjacent, as shown. The partition wall 220 may prevent communication between the chambers 222, 224.

The collection chamber 222 may be in communication with the first outlet 116 of the separator 102. As such, the collection chamber 222 may receive separated liquids and solids from the separator 102, e.g., elements that may not proceed into the second outlet 120. The collection chamber 222 may allow such elements to reside in the tank 104, e.g., without further separation processes, other than time and gravity, applied thereto. During a start-up phase, liquids and solids may flow into the collection chamber 222. Once the (mostly) liquid phase fills the collection chamber 222, further liquids may proceed out of the second outlet 120, while solids may continue to fall by gravity into the collection chamber 222 and sink toward the bottom. The solids (and some of the liquids) may be removed from the collection chamber 222 intermittently via the blowdown drain 130.

A washout apparatus or "sparge ring" 230 may be included in the collection chamber 222. Because of the geometry of the pressure tank 104, some solids may tend to remain in the collection chamber 222 during blowdown operations. Accordingly, the sparge ring 230 may receive a flow of water (or another liquid) via the washout connection 140 (FIG. 1), and direct the water to the walls of the interior of the collection chamber 222. This may wash such solids into the blowdown drain 130 and thus promote evacuation of solids from within the collection chamber 222.

Turning now to the separation chamber 224, the separation chamber 224 may include structures that promote separation of fluids based on density. For example, the separation chamber 224 may include a weir 240, which may extend upwards from a bottom of the separation chamber 224, but not all the way to the top thereof. The weir 240 may be positioned between the second inlet 124 and the outlets 128, 129. Accordingly, the weir 240 and the partition wall 220 may define a first liquid collection region 242 therebetween, which is aligned with the second inlet 124, so as to receive fluid directly therefrom. Further, the weir 240 may be positioned such that the outlet 126 and the drain 132 are positioned between the weir 240 and the partition wall 220, and are thus in communication with the first liquid collection region 242.

A second liquid (or "oil") collection region 244 may be defined by the weir 240 and an end 246 of the pressure tank 104. The outlet 128 may communicate directly with the second liquid collection region 244, and may allow for evacuation of liquid hydrocarbons (e.g., oil) through the outlet 128.

A gas collection region 248 may extend along the length of the separation chamber 224, above the water and second liquid collection regions 242, 244. The outlet 129, in the top of the pressure tank 104, may communicate directly with the gas collection region 248, and may allow for evacuation thereof.

Figure 3:
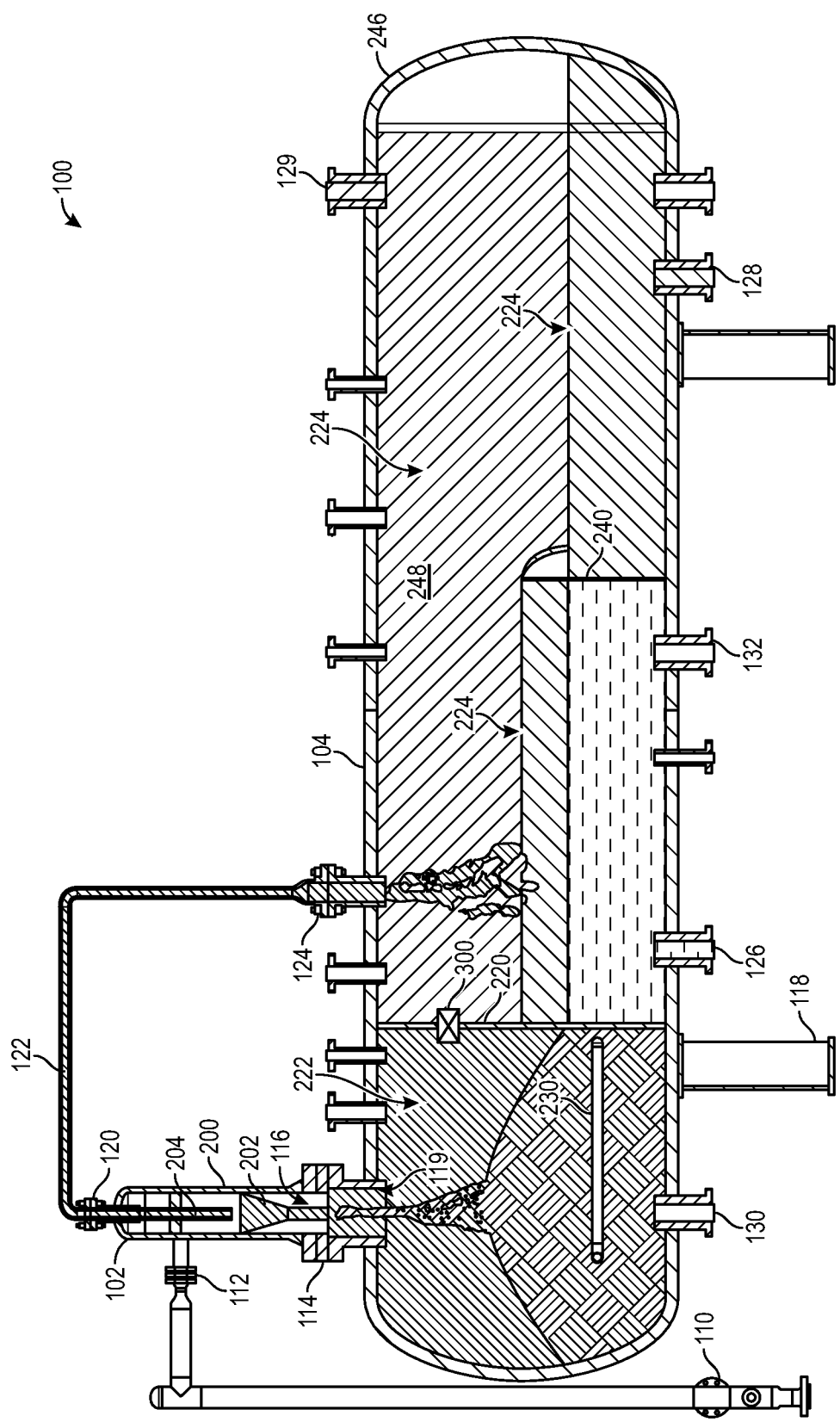
FIG. 3 illustrates a side, cross-sectional view of the separator system during operation thereof, according to an embodiment.

FIG. 3 illustrates a side, cross-sectional view of the system 100 during steady-state operation, according to an embodiment. As mentioned above, there may be a start-up operation stage, during which the inlet fluids are directed to the collection chamber 222, until the collection chamber 222 fills up and the liquid level reaches the bottom of the conical structure 202. After this point, as illustrated, the steady-state operation begins, in which the separator 102 acts to at least partially remove solids from the liquids/gases, and the liquids/gases proceed through the second outlet 120.

Accordingly, during (e.g., steady-state) operation, a multiphase or "mixed" fluid may be received via the inlet 110 into the separator system 100. The mixed fluid may include one or more immiscible liquids (e.g., water and oil), solids (e.g., sand), and/or gases (e.g., gaseous mixtures including methane). The mixed fluid may then be received into the (e.g., cyclone) separator 102, where it may be swirled into a vortex flow in the conical structure 202. In the conical structure 202, the vortex flow causes the solid components to separate from the liquids/gases. The solids then drop, by gravity, from the conical structure 202 into the collection chamber 222 of the pressure tank 104 via the first outlet 116 of the separator 102 and the first inlet 119 of the pressure tank 104. The collection chamber 222 thus serves to receive the separated solids, and in some embodiments, may not serve any other purpose.

The collection chamber 222 may include a down-flow system that may serve to initiate a small downward flow within the collection chamber 222. This may assist in flowing the solids (entrained in the liquid) downward in the collection chamber.

In the separator 102, the liquids and gases may flow inwards and upwards from within the conical structure 202, through the outlet tube 204. The liquids and gases may then flow through the second outlet 120, the crossover line 122, and the second inlet 124 of the pressure tank 104. As noted above, the second inlet 124 may open into the separation chamber 224. In particular, the second inlet 124 may be aligned with the first liquid collection region 242, between the partition wall 220 and the weir 240. The fluids received via the second inlet 124 may thus fill the first liquid collection region 242, with the immiscible liquids (e.g., water and oil) separating in the first liquid collection region 242 and stratifying based on density.

The less-dense liquids (e.g., oil) at the top of the first liquid collection region 242 may thus eventually spill over the weir 240. The less-dense liquids that spill over the weir 240 may be received into the second liquid collection region 244. The gaseous components of the mixed fluid received via the inlet 124 may also separate out, and may generally migrate upwards in the separation chamber 224 to the gas collection region 248.

The contents of the separation chamber 224 may be evacuated (allowed to leave the pressure tank 104), e.g., intermittently, so as to give the liquids and gases sufficient time to separate. Accordingly, the first liquid outlet 126 may be employed to drain the relatively denser liquid (e.g., water) from the bottom of the first liquid collection region 242. The second liquid outlet 128 may be employed to drain the relatively lighter liquid (e.g., oil) from the bottom of the second liquid collection region 244. The gas outlet 129 may be employed to evacuate gas from the top of the gas collection region 248.

In some embodiments, a pressure-relief valve 300 may optionally extend across the partition wall 220. This may serve to protect the partition wall 220 from excessive pressure-differentials between the separation chamber 224 and the collection chamber 222. Such a pressure-relief valve may include any suitable type of one-way (e.g., check) valve or a bi-directional valve, and may be configured to allow liquids or gases to flow between the collection chamber 222 and the separation chamber 224 so as to reduce a pressure differential therebetween.

Figure 4:
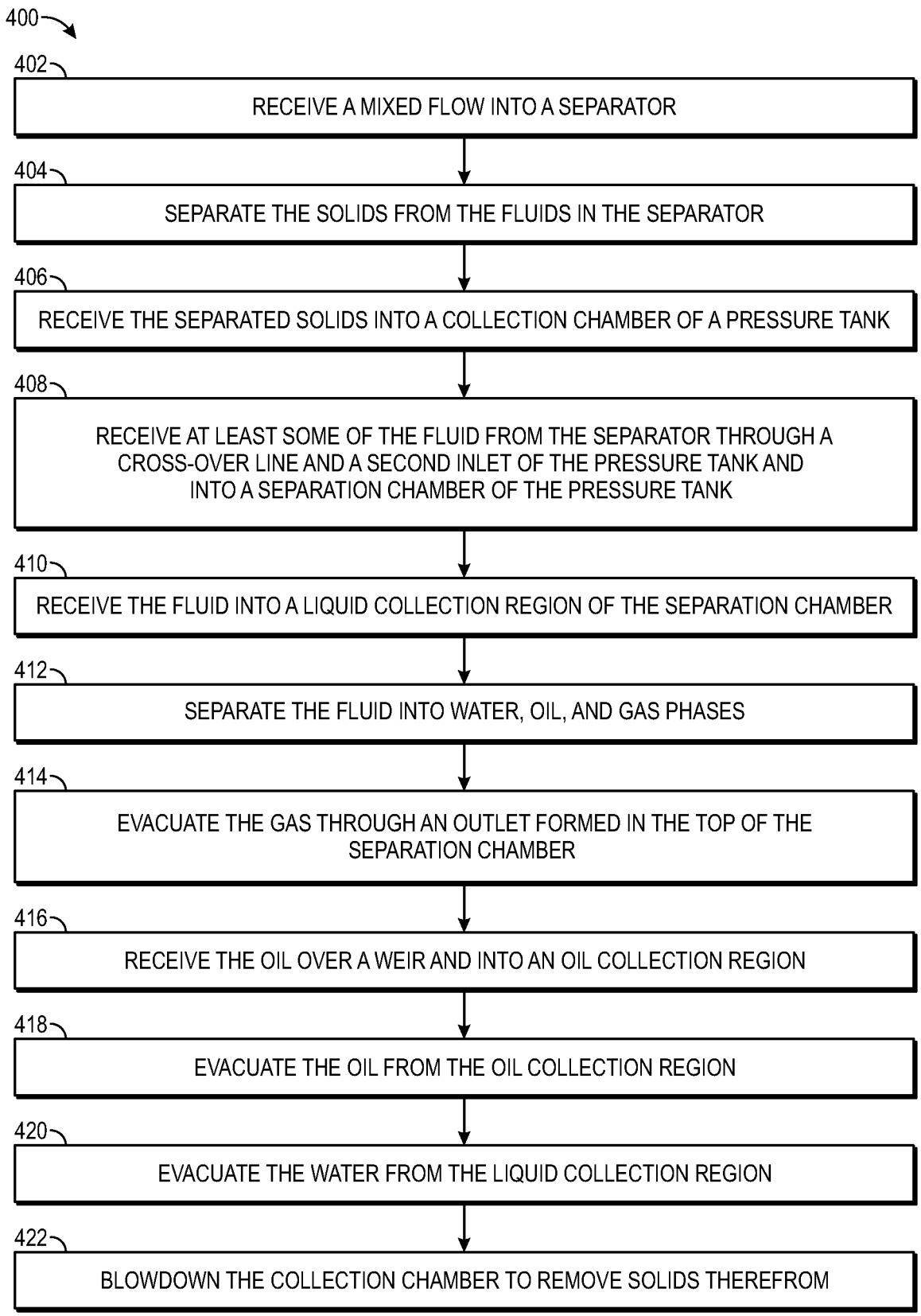
FIG. 4 illustrates a flowchart of a method for separating, according to an embodiment.

FIG. 4 illustrates a flowchart of a method 400 for separating, e.g., by operating the separation system 100, according to an embodiment. It will be appreciated that although the method 400 is described in the context of the separation system 100, this is merely for convenience, and various embodiments of the method 400 may be employed with other separation systems 100.

The method 400 may begin by receiving a mixed flow of liquids, solids, and gas through a separator inlet 112 of a separator 102, as at 402. The separator 102 is close-coupled and supported on a horizontally-oriented pressure tank 104. The separator 102 may serve to separate the solids from the fluids (e.g., liquids and/or gases) in the mixed flow, as at 404. The separated solids (and potentially some of the fluid) may be received through a first inlet 119 of the pressure tank 104 and into a collection chamber 222 that makes up a portion of the interior volume of the pressure tank 104, as at 406.

At least some of the fluid may be received from a second outlet 120 of the separator 102, through a crossover line 122, and into a second inlet 124 of the pressure tank 104 and into a separation chamber 224, as at 408. In some embodiments, at least during a transient start-up stage, at least some fluid may proceed through the first inlet 119 into the collection chamber 222, then back through the inlet 119, through the separator 102, and into the crossover line 122. During and after the transient, start-up phase, fluid in the crossover line 122, having at least some of the solids separated therefrom, may then proceed into the separation chamber 224.

In some embodiments, the separation chamber 224 is also part of the interior volume of the pressure tank 104, but is partitioned from the collection chamber 222. For example, the separation chamber 224 may be prevented from communication with the collection chamber 222. In other examples, a pressure-relief, check, or another type of valve may optionally be employed to provide for controlled pressure equalization between the two chambers 222, 224.

The fluid that flows through the second inlet 124 may be received into a first liquid collection region 242 of the separation chamber 224 of the pressure tank 104, as at 410. A weir 240 may be positioned in the separation chamber 224, defining an axial end of the first liquid collection region 242, while the partition wall 220 between the separation chamber 224 and the collection chamber 222 defines the other axial end thereof.

In the first liquid collection region 242, the fluid may separate into its component phases, e.g., water, liquid hydrocarbon (e.g., oil), and gas, as at 412. The gas may occupy the upper portion of the pressure tank 104, and may be evacuated, e.g., periodically, through an outlet 129 formed in the top of the tank 104, as at 414. The liquid hydrocarbon (e.g., oil) may float on the denser water, forming a top layer of the liquid in the first liquid collection region 242. Thus, upon reaching the top of the weir 240, the liquid hydrocarbon may flow over the weir 240 and into the second liquid (or "oil") collection region 244, while the water remains in the first liquid collection region 242, as at 416. Periodically, the water and liquid hydrocarbon may be evacuated via outlets 126, 128, respectively, formed in the bottom of the tank 104 in the first and second liquid collection regions 242, 244, respectively, as at 418 and 420.

Further, the solids and/or liquids in the collection chamber 222 may periodically be removed (blown-down) therefrom via a blowdown drain 130, as at 422.

Accordingly, it will be appreciated that the separation system 100 disclosed herein may provide an integrated, multi-stage separator function. The first stage may be a cyclone separator, and the second stage may be a gravity-based separator. The two stages may be coupled physically together, so as to minimize a footprint of the system 100. More particularly, the collection chamber 222 and the separation chamber 224, components of two different types of separators, may be contained within a single pressure tank 104.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A separator system, comprising:
    a separator comprising an inlet configured to receive a mixed fluid, a first outlet, and a second outlet, the separator being configured to at least partially separate a solids component of the mixed fluid from a liquid component and a gaseous component of the mixed fluid, and to direct the separated solids component to the first outlet and at least some of the liquid and gaseous components to the second outlet; and
    a pressure tank physically coupled to the separator, the pressure tank comprising:
        a partition wall defining a collection chamber and a separation chamber in the pressure tank, wherein the partition wall prevents fluid flow between the collection chamber and the separation chamber when a pressure differential therebetween is less than a predetermined level;
        a pressure-relief valve coupled to the partition wall, wherein the pressure-relief valve allows fluid flow between the collection chamber and the separation chamber when the pressure differential therebetween is greater than the predetermined level;
        a first inlet communicating with the collection chamber and coupled to the first outlet of the separator, the first inlet being configured to receive at least some of the solids component from the first outlet and provide the solids component to the collection chamber;
        a second inlet communicating with the separation chamber and in communication with the second outlet of the separator, wherein the second inlet is configured to receive at least some of the liquid component and the gaseous component from the second outlet;
        a first drain in communication with the collection chamber;
        a first liquid outlet in communication with the separation chamber, wherein the first liquid outlet is configured to allow at least a portion of the liquid component that is received into the separation chamber to be removed therefrom; and a gas outlet in communication with the separation chamber, wherein the gas outlet is configured to allow at least a portion of a gaseous component that is received into the separation chamber to be removed therefrom.

2. The separator system of claim 1, wherein the separator comprises a cyclone separator.

3. The separator system of claim 1, wherein the separator comprises a flange connection physically connecting the separator to the pressure tank.

4. The separator system of claim 1, wherein the pressure tank further comprises a washout system positioned at least partially in the collection chamber, and wherein the washout system is configured to wash solids toward the first drain.

5. The separator system of claim 1, wherein the separation chamber comprises a weir, wherein the separator system defines a first liquid collection region on one side of the weir, and a second liquid collection region on a second side of the weir, and wherein the first liquid outlet is in communication with the first liquid collection region, and a second liquid outlet of the pressure tank is in communication with the second liquid collection region.

6. The separator system of claim 5, wherein a gas collection region extends between the partition wall and an end of the pressure tank, and wherein the gas outlet is in communication with the gas collection region.

7. A pressure tank comprising:
a partition wall between a collection chamber and a separation chamber defined in the pressure tank;
a pressure-relief valve coupled to the partition wall, wherein the pressure-relief valve allows fluid flow between the collection chamber and the separation chamber when a pressure differential therebetween is greater than a predetermined level;
a first inlet communicating with the collection chamber and physically coupled to a first outlet of a separator, wherein the first inlet receives a solids component from the first outlet and provide the solids component to the collection chamber;
a second inlet communicating with the separation chamber and in communication with a second outlet of the separator, wherein the second inlet receives a liquid component and a gaseous component from the second outlet of the separator;
a first drain in communication with the collection chamber;
a first liquid outlet in communication with the separation chamber, wherein the first liquid outlet allows at least a portion of the liquid component that is received into the separation chamber to be removed therefrom; and
a gas outlet in communication with the separation chamber, wherein the gas outlet allows at least a portion of the gaseous component that is received into the separation chamber to be removed therefrom.

8. The pressure tank of claim 7, further comprising a washout system positioned at least partially in the collection chamber, wherein the washout system is configured to wash solids toward the first drain.

9. The pressure tank of claim 7, further comprising a weir positioned in the separation chamber, wherein the separation system defines a first liquid collection region on one horizontal side of the weir, and a second liquid collection region on a second horizontal side of the weir, and wherein the first liquid outlet is in communication with the first liquid collection region, and a second liquid outlet of the pressure tank is in communication with the second liquid collection region.

10. The pressure tank of claim 7, wherein a gas collection region extends between the partition wall and an end of the pressure tank in the separation chamber, and wherein the gas outlet is in communication with the gas collection region.

11. The pressure tank of claim 7, wherein the pressure tank is configured to be horizontally-oriented, such that the collection chamber is horizontally adjacent to the separation chamber.

12. The pressure tank of claim 7, wherein the partition wall prevents fluid flow between the collection chamber and the separation chamber when the pressure differential therebetween is less than the predetermined level.

\* \* \* \* \*